(No Model.)

H. C. DEXTER.
INSECT CATCHER.

No. 454,720. Patented June 23, 1891.

Attest:
Geo. T. Smallwood.
Geo. L. Wheelock.

Inventor:
Himan C. Dexter
per R. D. Dubois.
Attorney.

UNITED STATES PATENT OFFICE.

HIMAN C. DEXTER, OF NEW YORK, N. Y.

INSECT-CATCHER.

SPECIFICATION forming part of Letters Patent No. 454,720, dated June 23, 1891.

Application filed December 31, 1890. Serial No. 376,412. (No model.)

*To all whom it may concern:*

Be it known that I, HIMAN C. DEXTER, a citizen of the United States, residing at New York, in the county of New York and State of New York, have invented certain new and useful Improvements in Insect-Catchers; and I do hereby declare the following to be a full, clear, and exact description of the invention, such as will enable others skilled in the art to which it appertains to make and use the same.

My invention relates to an insect-catcher, its object being the production of a device that will be effectual in capturing flies and other insects whenever there is an opportunity, and it is particularly adapted for the use of entomologists and others who may desire to make collections of insects.

My invention consists in certain features of novelty to be hereinafter described, and then particularly pointed out in the claims.

Figure 1:
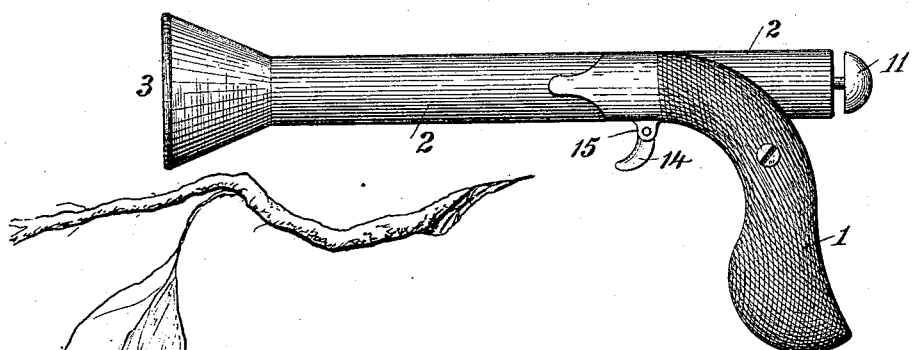
Figure 2:
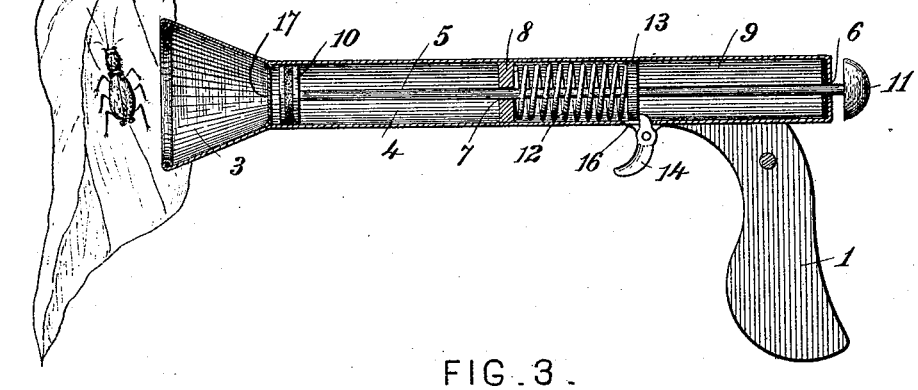
Figure 3:
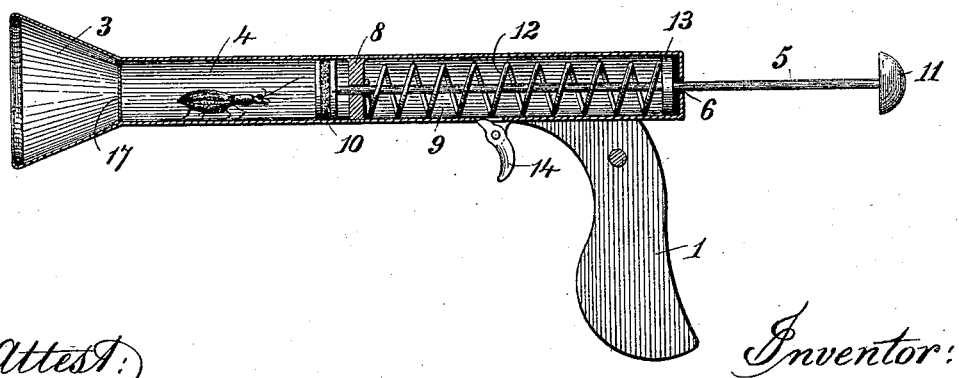

In the accompanying drawings, Figure 1 is an elevation of my insect-catcher. Fig. 2 is a longitudinal section thereof, showing the device in operative position. Fig. 3 is a similar view showing it in inoperative position.

1 represents the handle, shaped like an ordinary pistol-handle, and 2 represents a barrel of cylindrical shape.

The barrel may have a flaring mouth or muzzle 3. Through this mouth or muzzle the insects are drawn into a chamber 4 in the barrel 2 by means of the mechanism now to be described.

5 is a piston-rod that is arranged longitudinally of the barrel 2 and slides through perforations 6 and 7, respectively, in the back end of the barrel and in a partition 8, that separates the front chamber or receptacle 4 from the rear chamber 9. At the front end of the piston-rod is a plunger or piston-head 10, that moves within the chamber 4, in which it is fitted air-tight, and at its rear end, which projects outside the barrel, is a push-button 11.

Coiled around the piston-rod and fitting closely in the chamber 9 is a spiral expansion-spring 12, one end of which is in contact with the partition 8 and the other end is in contact with a flange or collar 13, that is of about the same diameter as the chamber 9.

14 is the trigger, which is pivoted to a lug 15, projecting downwardly from the barrel alongside an opening 16, through which latter the upper end of the trigger projects, so as to engage the back of the flange or collar 13. The front end of the chamber 4 is closed by a flap-valve 17.

When it is desired to capture an insect, the mouth or muzzle of the device is held a little way off from it and the trigger 14 pulled back, and this releases the upper end of the trigger from the flange 13, thus permitting the compressed spring 12 to expand and draw back the plunger 10, drawing air into the chamber and opening the valve 17 to admit the insect sucked in. As soon as the piston-rod has been pushed back to its extreme limit the valve 17 automatically closes and prevents the escape of the insect.

It will be observed that the principle of this invention is just the reverse of an ordinary air-gun, which compresses the air to force a bullet from the gun.

In this invention the expansion-spring as it acts rearwardly to draw the piston-rod back causes the plunger to suck air into the front chamber, forming a vacuum.

Having thus described my invention, what I claim as new therein, and desire to secure by Letters Patent, is—

1. In a toy pistol for catching insects, the combination of a barrel provided with a back-acting spring-piston, a stem for compressing the spring and setting the piston, a trigger for holding and releasing the piston, and a valve at the mouth of the chamber, substantially as described.

2. In a toy pistol for catching insects, a barrel provided with a back-acting spring-piston having a stem arranged to engage a trigger, in combination with a valve and partition forming a closed chamber for holding insects, substantially as described.

3. In a toy pistol for catching insects, the combination of a barrel containing a back-acting piston provided with a stem extending through the rear of the barrel, and a valve located at the mouth of the barrel for keeping the insects within, substantially as described.

4. In a toy pistol for catching insects, the combination of a barrel having a flaring mouth, a valve located at the mouth, a back-acting spring-piston provided with a stem projecting through the rear of the barrel, and a trigger for releasing said piston, as and for the purpose set forth.

5. In a toy pistol for catching insects, a barrel containing a back-acting piston provided with a setting-stem projecting through the rear of the barrel, in combination with a catch upon the stem, a spring, and trigger, as set forth.

6. In a toy pistol for catching insects, a barrel having an insect-receiving chamber containing a back-acting piston provided with a stem for setting it, in combination with a spring, a catch, and a trigger, substantially as described.

7. In a toy pistol for catching insects, a barrel provided with a suction device, substantially as described, in combination with a valve located at the mouth of the barrel to retain the insects, as set forth.

In testimony whereof I affix my signature in presence of two witnesses.

HIMAN C. DEXTER.

Witnesses:
R. C. TREADWELL,
HENRY C. SQUIRES.